US012710151B2

(12) United States Patent
Jung et al.

(10) Patent No.: US 12,710,151 B2
(45) Date of Patent: Aug. 18, 2026

(54) LAMP FOR VEHICLE

(71) Applicant: SL Corporation, Daegu (KR)

(72) Inventors: Jin Young Jung, Gyeongsan-si (KR); Jun Tae Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/073,227

(22) Filed: Mar. 7, 2025

(65) Prior Publication Data

US 2025/0334242 A1 Oct. 30, 2025

(30) Foreign Application Priority Data

Mar. 12, 2024 (KR) ........................ 10-2024-0034535

(51) Int. Cl.

*F21S 41/24* (2018.01)
*F21S 41/143* (2018.01)
*F21S 41/20* (2018.01)
*F21S 41/43* (2018.01)

(52) U.S. Cl.

CPC ............. *F21S 41/24* (2018.01); *F21S 41/143* (2018.01); *F21S 41/285* (2018.01); *F21S 41/43* (2018.01)

(58) Field of Classification Search

CPC .......... F21S 41/24; F21S 41/143; F21S 41/43; F21S 41/285

See application file for complete search history.

(56) References Cited

U.S. PATENT DOCUMENTS

| | | | | |
|---|---|---|---|---|
| 12,078,310 | B2 * | 9/2024 | Mun | F21S 41/285 |
| 12,092,282 | B2 * | 9/2024 | Jun | F21S 41/265 |
| 12,203,619 | B2 * | 1/2025 | Jun | F21S 41/285 |
| 12,392,467 | B2 * | 8/2025 | Jin | F21S 41/148 |
| 2021/0341123 | A1 * | 11/2021 | Mototsuji | F21S 41/265 |
| 2024/0184021 | A1 * | 6/2024 | Kazama | F21S 41/322 |

* cited by examiner

*Primary Examiner* — Matthew J. Peerce

(74) *Attorney, Agent, or Firm* — United One Law Group LLC; Kongsik Kim; Jhongwoo Peck

(57) ABSTRACT

A vehicle lamp includes at least one light source; and at least one optical member disposed in front of the light source to allow light emitted from the light source to be irradiated therethrough in a forward direction to form a beam pattern. The optical member includes a plurality of facets arranged in a predetermined direction to constitute a light emission surface of the optical member, and the light is emitted from the light emission surface in the forward direction. A center line vertically extends in a perpendicular manner to an optical axis of the optical member. Positions of facets belonging to at least one of both opposing areas with respect to the center line among the plurality of facets shift rearward as they go away from the center line to a side, such that a step formed between adjacent facets is directed rearward.

15 Claims, 17 Drawing Sheets

LAMP FOR VEHICLE

CROSS-REFERENCE TO RELATED APPLICATION

This application claims priority from Korean Patent Application No. 10-2024-0034535 filed on Mar. 12, 2024, which is incorporated herein by reference in its entirety.

BACKGROUND

1. Technical Field

The present disclosure relates to a lamp for a vehicle, and more particularly, to a lamp for a vehicle capable of generating an optimal beam pattern while implementing a slim form factor.

2. Description of Related Art

In general, a vehicle is provided with various lamps having an illumination function to allow the driver to more easily identify an object located around the vehicle during low-light conditions (e.g., night-time driving) and a signaling function for notifying a surrounding vehicle or a pedestrian of a driving state of the vehicle.

For example, a headlamp and a fog lamp are mainly used for the illumination functions, and a turn signal lamp, a tail lamp, and a brake lamp are mainly used for the signaling functions. In this regard, each of the lamps is stipulated by law in its installation standards and specifications so that each lamp can fully perform each function.

Recently, not only the functional aspect of aiding safe driving by enabling the driver to secure visibility as the basic role of lamp for the vehicles, but also the aesthetic aspect that consumers feel through the improvement of outer appearance design has a great influence on the consumers' purchase decisions.

To this end, research has been actively conducted to allow the lamp for the vehicle to be able to form the optimal beam pattern while having a slimmer outer appearance design.

SUMMARY

A purpose to be achieved by the present disclosure is to provide a lamp for a vehicle in which when light emitted from a plurality of light sources is irradiated through a plurality of light guiding lenses and then through a plurality of optical lenses to form a beam pattern, light may be prevented from being irradiated to undesired regions by adjusting the direction in which a step formed between adjacent facets among a plurality of facets that constitute a light emission surface of each of the plurality of optical lenses faces.

The technical purposes of the present disclosure are not limited to those mentioned above, and other technical purposes not mentioned may be clearly understood by those skilled in the art from descriptions as set forth below.

In order to achieve the above purpose, a lamp for a vehicle according to an embodiment of the present disclosure may include at least one light source; and at least one optical member disposed in front of the at least one light source to allow light emitted from the at least one light source to be irradiated therethrough in a forward direction and to form a predetermined beam pattern. The at least one optical member may include a plurality of facets arranged in a predetermined direction to constitute a light emission surface of the at least one optical member, and the light may be emitted from the light emission surface in the forward direction. A center line may vertically extend in a perpendicular manner to an optical axis of the at least one optical member, and positions of facets belonging to at least one of both opposing areas with respect to the center line of the light emission surface among the plurality of facets may shift rearward as the positions thereof are arranged away from the center line to a side, such that a step formed between adjacent facets may be directed rearward.

An edge area of each facet that forms the step among the plurality of facets may include a curved shape having a predetermined curvature The beam pattern may be formed such that the light is irradiated below a cut-off line, and the cut-off line may include a first line and a second line, which extend and are arranged in a left-right direction. The first line may be disposed higher than the second line. The first line may correspond to a driving lane of the vehicle, and the second line may correspond to an opposite lane to the driving lane.

The both opposing areas with respect to the center line of the light emission surface may include a first area through which light for forming the first line is emitted; and a second area through which light for forming the second line is emitted. The light emitted from the first area and the light emitted from the second area may be emitted by crossing each other such that an arrangement direction of the first line and the second line is flipped from an arrangement direction of the first area and the second area.

In some embodiments, positions of facets belonging to the first area of the light emission surface among the plurality of facets may recede rearward as the positions thereof are arranged away from the center line to a side, such that a step formed between adjacent facets is directed rearward.

In some embodiments, positions of facets belonging to the second area of the light emission surface among the plurality of facets may recede rearward as the positions thereof are arranged away from the center line to a side, such that a step formed between adjacent facets is directed rearward.

In some embodiments, positions of facets belonging to the second area of the light emission surface among the plurality of facets may progress forward as the positions thereof are arranged away from the center line to a side, such that a step formed between adjacent facets is directed forward.

In some embodiments, positions of the plurality of facets may recede rearward as the positions thereof are arranged away from a position of the facet disposed at a center of the light emission surface toward both opposing sides, such that a step formed between the adjacent facets is directed rearward.

The at least one light source may include a plurality of light sources arranged in a vertical direction, and the at least one optical member may include a plurality of optical members arranged in an arrangement direction of the plurality of light sources.

The at least one optical member may include a light guiding lens disposed in front of the at least one light source; and an optical lens disposed in front of the light guiding lens. The light emission surface of the at least one optical member may constitute a light emission surface of the optical lens. The light guiding lens may include a light receiving portion to which the light emitted from the at least one light source is incident; a light emission portion disposed in front of the light receiving portion so as to emit the light incident thereto from the light receiving portion; and a shield portion including an edge portion disposed at a rear focus of the light emission portion, the edge portion being configured to obstruct a portion of the light from being directed to the light emission portion. The plurality of facets may be arranged along a direction in which the edge portion extends.

The edge portion may include a first edge; and a second edge having a vertical level higher than a vertical level of the first edge. Positions of facets belonging to one area corresponding to the first edge among the both opposing areas with respect to the center line of the light emission surface, among the plurality of facets may recede rearward as the positions thereof are arranged away from the center line to a side, such that a step formed between adjacent facets is directed rearward.

In some embodiments, the edge portion may extend in parallel to a horizontal line. In some embodiments, the edge portion may be inclined at a predetermined angle with respect to a reference line that is parallel to a horizontal line.

The specific details of other embodiments are included in the detailed description and drawings.

According to the lamp for the vehicle of the present disclosure as described above, one or more of following effects are provided.

When the light emitted from the plurality of light sources is irradiated through the plurality of light guiding lenses and subsequently through the plurality of optical lenses to form a beam pattern with a cut-off line having the first line and the second line formed at different vertical levels, positions of the facets belonging to an area of the light emission surface of each of the plurality of optical lenses from which the light forming the first line having a higher position than that of the second line is emitted are closer to a rear side as the positions thereof are arranged in a direction from the center line to a side end, such that a step formed between adjacent facets faces in a rearward direction. Thus, the light that forms the first line may be irradiated to the position on top of the second line, thereby preventing the formation of the glare.

The effects of the present disclosure are not limited to those mentioned above, and other effects not mentioned will be clearly understood by those skilled in the art from the present disclosure.

BRIEF DESCRIPTION OF THE DRAWINGS

The above and other aspects and features of the present disclosure will become more apparent by describing in detail illustrative embodiments thereof with reference to the attached drawings, in which.

DETAILED DESCRIPTIONS

Figure 1:
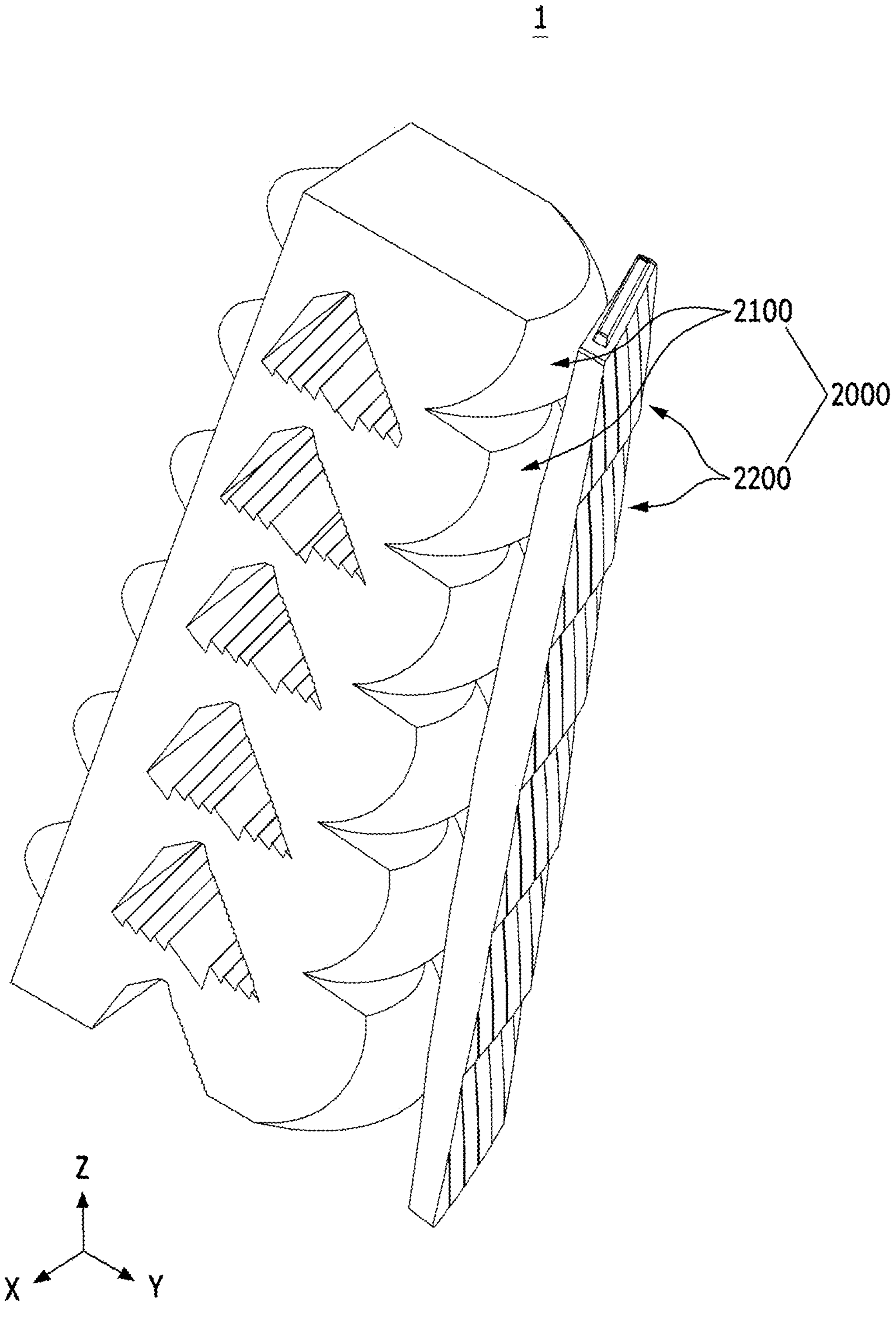
FIGS. 1 and 2 are perspective views showing a lamp for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to drawings for illustrating a lamp for a vehicle according to some embodiments of the present disclosure.

Figure 2:
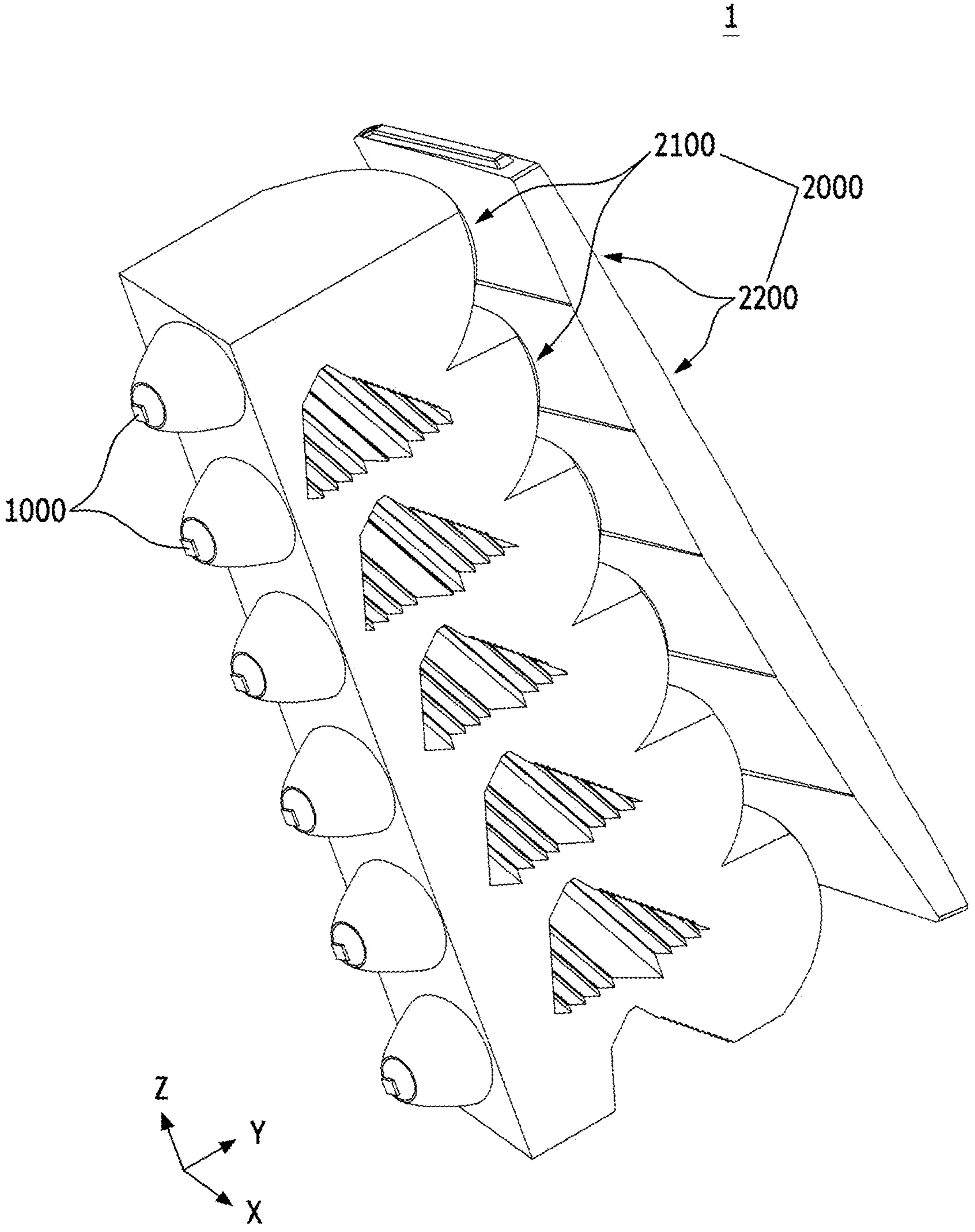
Figure 3:
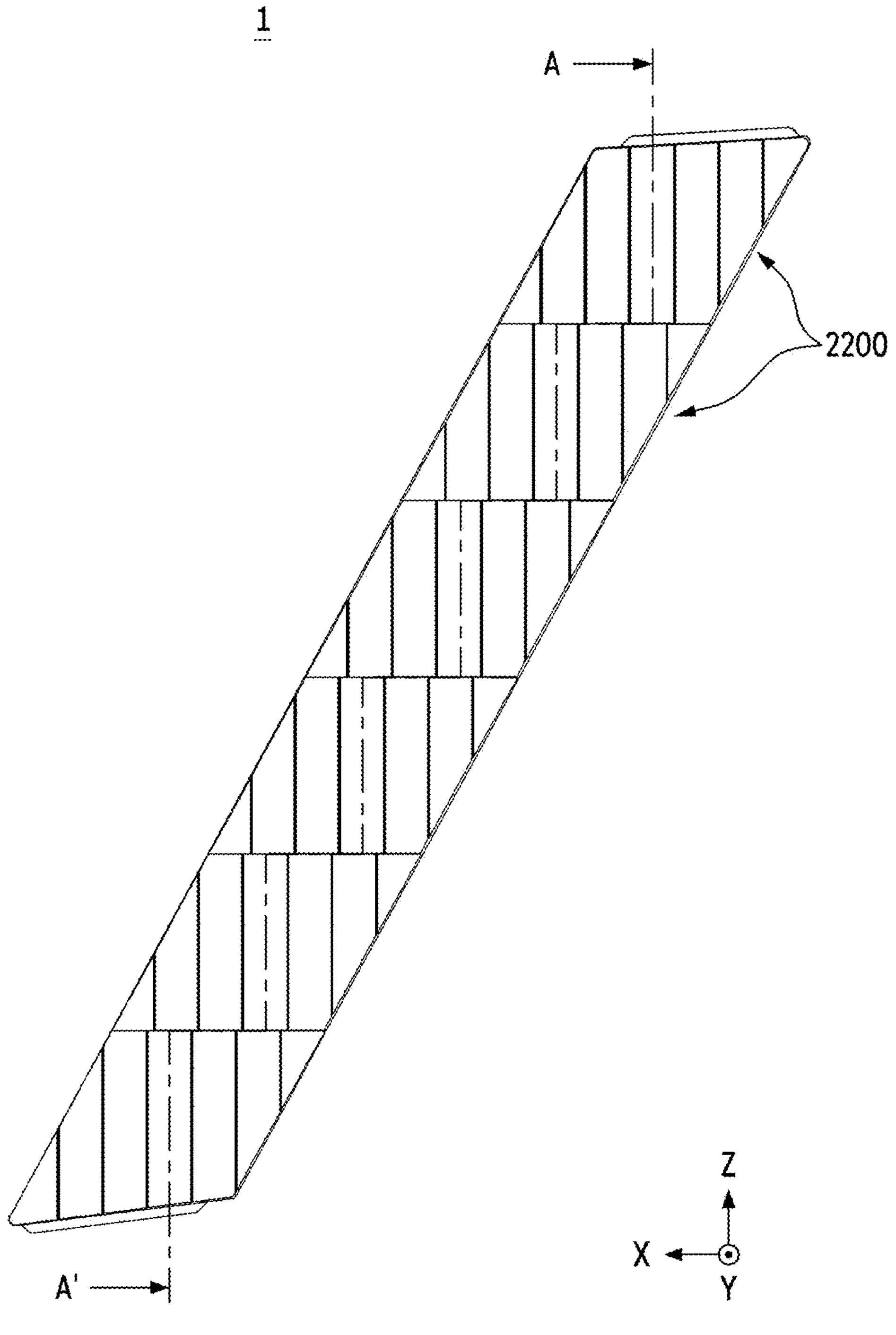
FIG. 3 is a front view illustrating a lamp for a vehicle according to an embodiment of the present disclosure.
Figure 4:
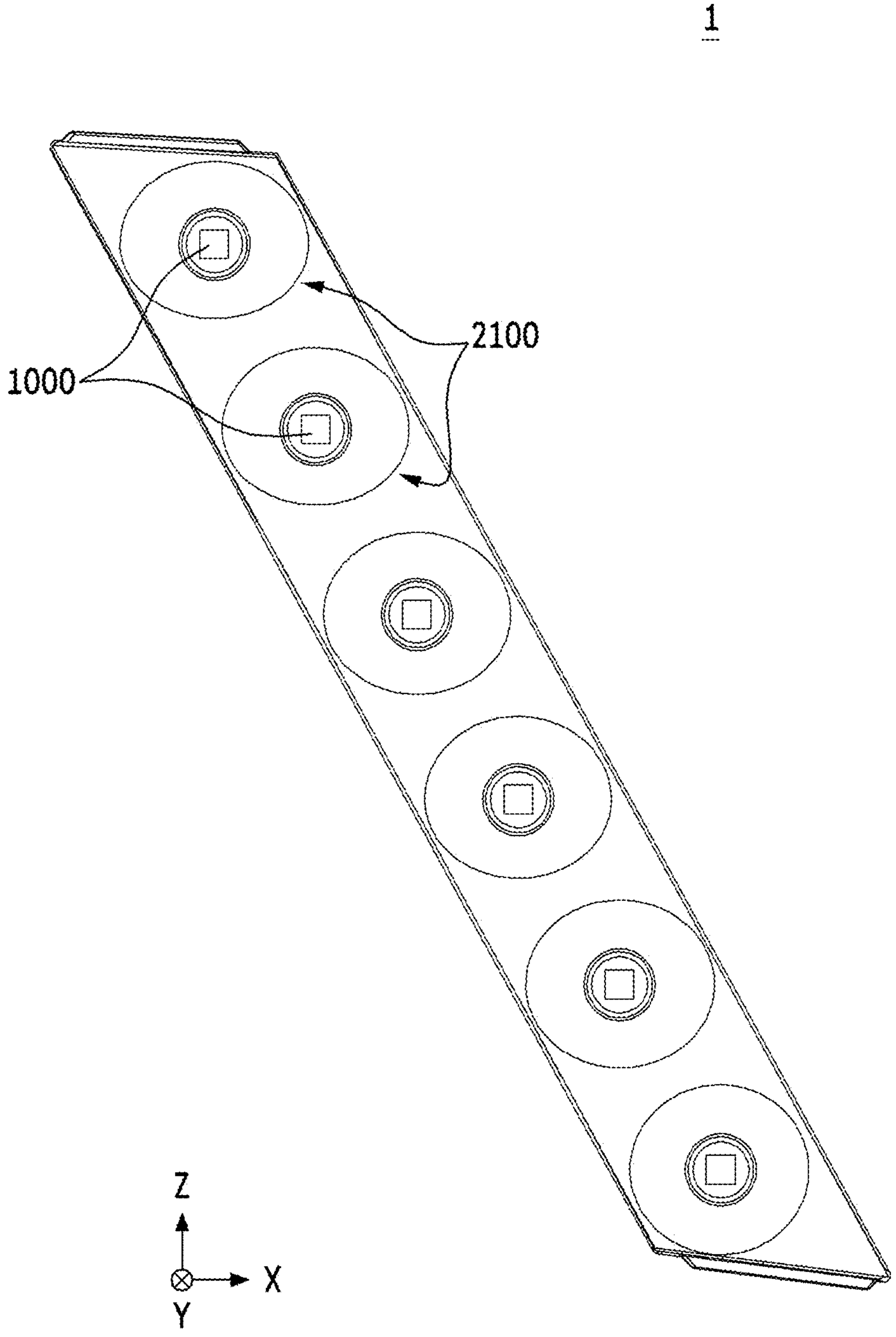
FIG. 4 is a rear view illustrating a lamp for a vehicle according to an embodiment of the present disclosure.
Figure 5:
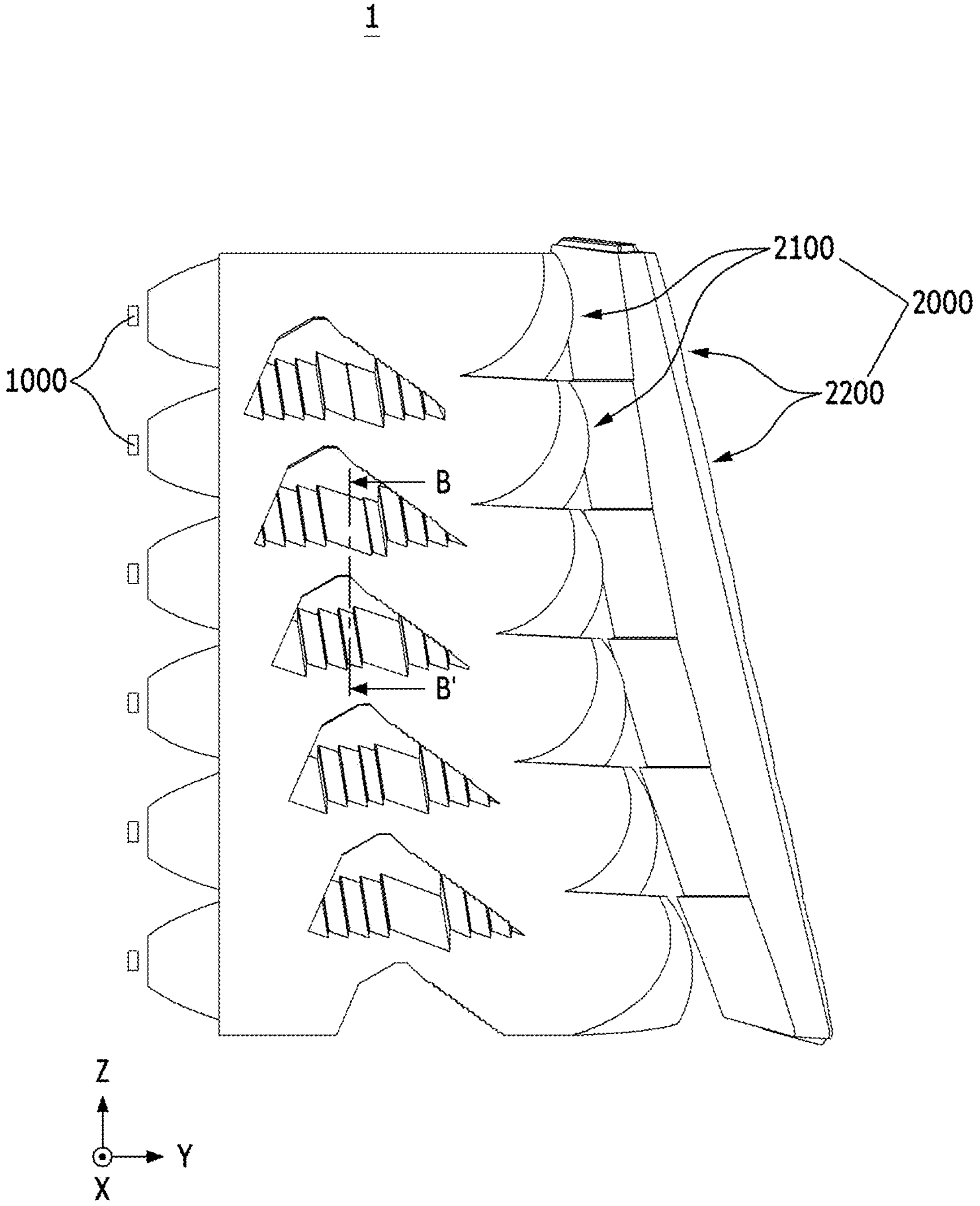
FIG. 5 is a side view illustrating a lamp for a vehicle according to an embodiment of the present disclosure.
Figure 6:
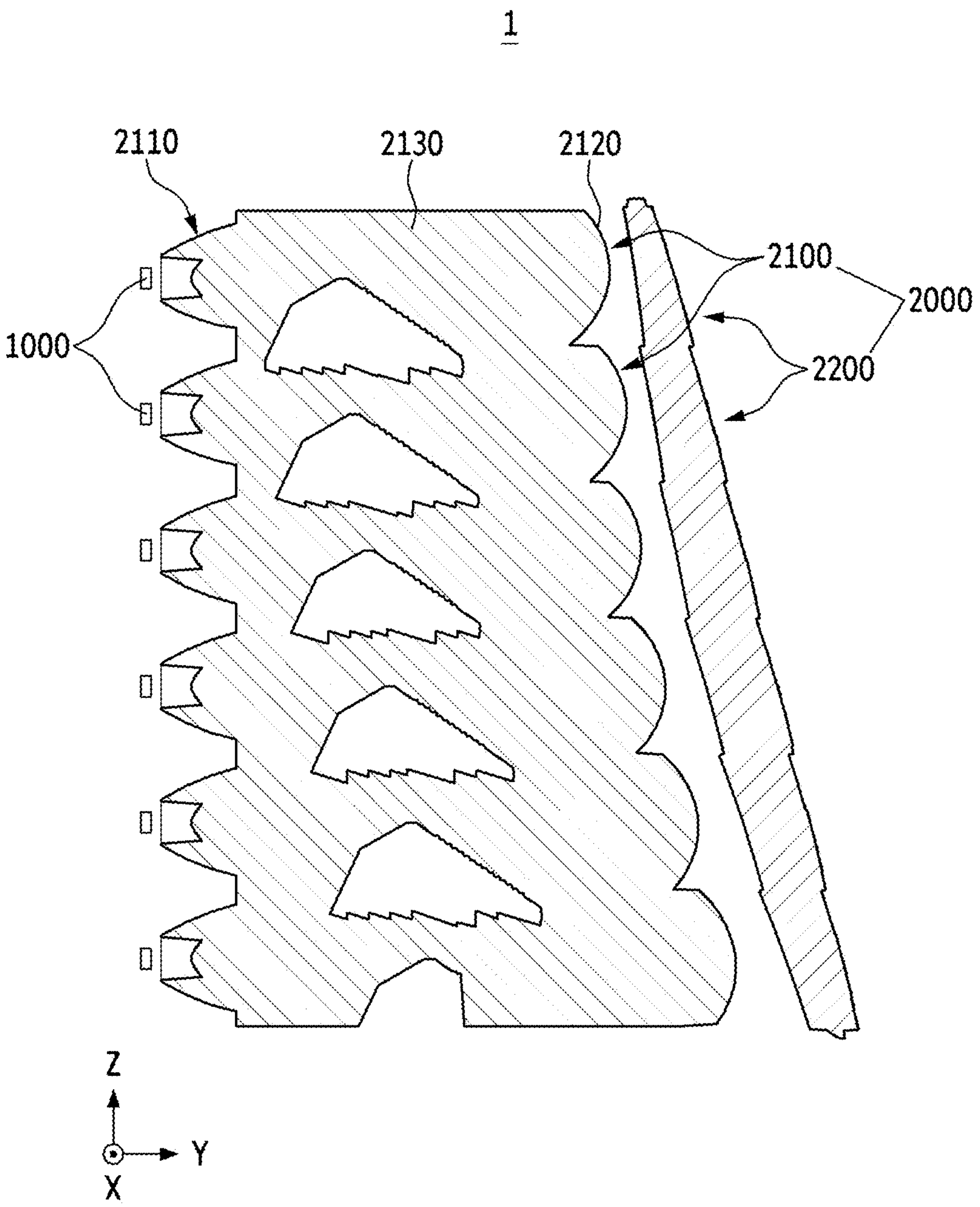
FIG. 6 is a cross-sectional view taken along line A-A' of FIG. 3.

FIGS. 1 and 2 are perspective views showing a lamp for a vehicle according to an embodiment of the present disclosure, FIG. 3 is a front view showing the lamp for a vehicle according to an embodiment of the present disclosure, FIG. 4 is a rear view showing the lamp for a vehicle according to an embodiment of the present disclosure, FIG. 5 is a side view showing the lamp for a vehicle according to an embodiment of the present disclosure, and FIG. 6 is a cross-sectional view taken along line A-A' of FIG. 3.

Referring to FIGS. 1 to 6, a lamp 1 for a vehicle according to an embodiment of the present disclosure may include a plurality of light sources 1000 and a plurality of optical members 2000.

In an embodiment of the present disclosure, a case in which the lamp 1 for a vehicle is used as a head lamp for irradiating light in a driving direction of the vehicle during night driving of the vehicle to secure a front field of view in front of the vehicle will be described by way example. In this regard, a case in which an X-axis direction means a vehicle width direction as a left-right direction (e.g., lateral direction), and a Y-axis direction means a traveling direction (forward or backward) as a front-rear direction (e.g., longitudinal direction), and a Z-axis direction means a vehicle height direction as a vertical direction (e.g., up-down direction) will be described by way of example. However, the present disclosure is not limited thereto, and the directions actually meant by the X-axis, the Y-axis, and the Z-axis may be changed depending on the position at which the lamp for the vehicle 1 of the present disclosure is installed or a direction in which the lamp for the vehicle is oriented.

The example in which the lamp for the vehicle 1 according to an embodiment of the present disclosure acts as the head lamp that irradiates light in the proceeding direction of the vehicle to secure the sight in front of the vehicle is merely an example for helping the understanding of the present disclosure, and the present disclosure is not limited thereto. The lamp 1 for a vehicle according to the present disclosure may be used as various lamps installed in and on the vehicle, such as a tail lamp, a brake lamp, a turn signal lamp, a fog lamp, a backup lamp, a position lamp, and the like, as well as the head lamp.

Figure 7:
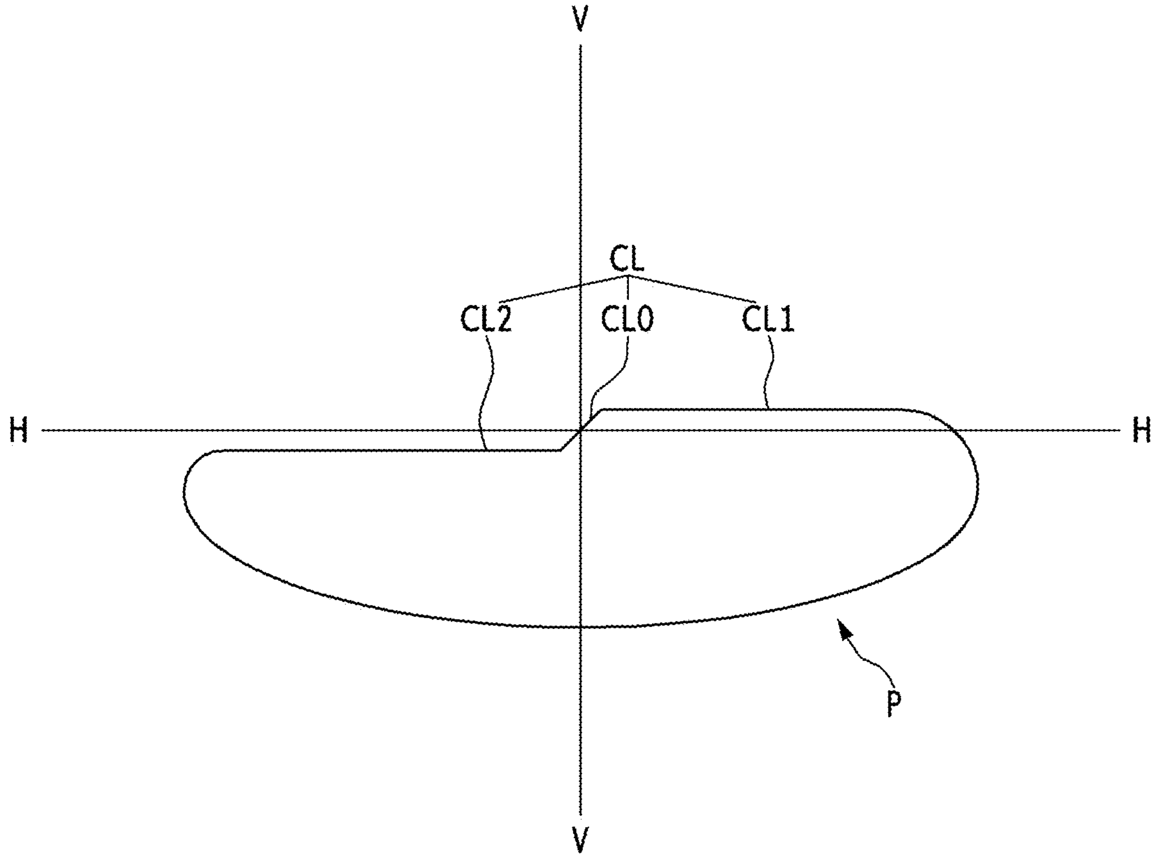
FIG. 7 is a schematic view illustrating a beam pattern generated from a lamp for a vehicle according to an embodiment of the present disclosure.

When the lamp 1 for a vehicle of the present disclosure is used as the head lamp, the lamp 1 for a vehicle of the present disclosure may generate at least one of a low beam pattern for securing a wider field of view within a relatively shorter distance in front of the vehicle by irradiating light to a lower side with respect to a cut-off line so that glare does not occur to a driver of a vehicle in front thereof, such as a preceding vehicle or an on-coming vehicle, or a high beam pattern for securing a field of view along a relatively longer distance in front of the vehicle by irradiating light to an upper side with respect to the cut-off line. Hereinafter, in an embodiment of the present disclosure, a case in which the low beam pattern P is formed when the light is irradiated from the head lamp, that is, the lamp 1 for a vehicle of the present disclosure to the lower side below the cut-off line CL as shown in FIG. 7 will be described by way of example. It may be understood that the low beam pattern P in FIG. 7 may be a beam pattern formed by the lamp for the vehicle 1 of the present disclosure irradiating the light on a screen positioned at a set distance in front of the vehicle.

In this regard, in an embodiment of the present disclosure, a case in which the cut-off line CL has a first line CL1 corresponding to the driving lane, a second line CL2 corresponding to an opposite lane thereto, and an inclined line CL0 that connects the first line CL1 and the second line CL2 will be described by way of example. Accordingly, the first line CL1, the second line CL2, and the inclined line CL0 extend in a stepwise manner due to the inclined line CL0 between the first line CL1 and the second line CL2 so that the first line CL1 is formed at a higher position than the second line CL2 such that the light irradiation distance to the driving lane is relatively longer. However, this configuration is merely an example for helping understanding of the present disclosure, and the present disclosure is not limited thereto. The cut-off line CL may be formed to have substantially the same vertical level. In this case, the inclined line CL0 may be omitted, and the first line CL1 and the second line CL2 may extend as one substantially flat line while forming no step.

In one example, the beam pattern of the lamp 1 for the vehicle of the present disclosure may be formed by overlapping (e.g., superimposing) the beam patterns respectively formed by the light sources and the optical members corresponding to each other among the plurality of light sources 1000 and the plurality of optical members 2000.

In an embodiment of the present disclosure, a case in which the lamp 1 for the vehicle includes the plurality of light sources 1000 and the plurality of optical members 2000 will be described by way of example. This is merely an example for helping the understanding of the present disclosure, and the present disclosure is not limited thereto. The number of light sources and the number of optical members included in the vehicle lamp 1 of the present disclosure may vary depending on the light distribution characteristics required in the beam pattern to be formed by the lamp 1 for the vehicle of the present disclosure, that is, the position, shape, size, brightness, and the like of the area to which the light is irradiated.

In addition, in an embodiment of the present disclosure, a case in which the plurality of light sources 1000 and the plurality of optical members 2000 correspond to each other in an one-to-one manner is described by way of example. However, the present disclosure is not limited thereto. The light sources and the optical members may correspond to each other in a one-to-one manner, a many-to-one manner, a one-to-many manner, a many-to-many manner, or the like depending on the light distribution characteristics required in the beam pattern formed by the lamp 1 for the vehicle of the present disclosure.

The plurality of light sources 1000 may generate light having a light amount and/or color suitable for the use of the lamp for the vehicle 1 of the present disclosure.

In an embodiment of the present disclosure, a case in which the plurality of light sources 1000 are arranged along the vertical direction such that the center positions of the plurality of light sources 1000 do not overlap one another in the vertical direction and thus are disposed closer to one side along the left-right direction progressively as they ascend will be described by way of example. This configuration is to allow the plurality of light sources 1000 to be arranged along a body line of the vehicle.

For example, the lamp 1 for a vehicle according to the present disclosure may be accommodated in an inner space defined by a lamp housing and a cover lens coupled to the lamp housing. The plurality of light sources 1000 may be arranged in conformity with the shape of the cover lens that constitutes a portion of the body line (e.g., contour) of the vehicle.

That the plurality of light sources 1000 are arranged along the body line of the vehicle may mean that the plurality of optical members 2000 may also be arranged along the body line of the vehicle similar to the plurality of light sources 1000.

In this regard, as the plurality of light sources 1000 and the plurality of optical members 2000 are arranged in the vertical direction, the lamp 1 for a vehicle according to the present disclosure may realize a slimmer form factor, which extends in the vertical direction, thereby improving the aesthetics.

In an embodiment of the present disclosure, a case in which a semiconductor light-emitting device such as a light-emitting diode (LED) is used as each of the plurality of light sources 1000 will be described by way of example. However, the present disclosure is not limited thereto, and various types of light sources such as a laser diode (LD) or a bulb, as well as an LED, may be used as each of the plurality of light sources 1000. Further, optical elements such as a reflector, a prism, a mirror, and a phosphor for adjusting a path, brightness, color, and the like of light may be additionally used depending on the type of the light sources.

The plurality of optical members 2000 may be arranged in the vertical direction in accordance with the arrangement direction of the plurality of light sources 1000. For reasons similar to those related to the plurality of light sources 1000, the plurality of optical members 2000 may be arranged along the vertical direction such that the center positions of the plurality of optical members 2000 do not overlap one another in the vertical direction with their positions shifted closer to one side along the left-right direction gradually as they ascend.

Each of the plurality of optical members 2000 may include a light guiding lens 2100 and an optical lens 2200. A light receiving surface of each of the plurality of optical members 2000 may be understood as a light receiving portion 2110 of the light guiding lens 2100 to be described later, and a light emission surface of each of the plurality of optical members 2000 may be understood as a light emission surface 2220 of the optical lens 2200 to be described later.

In an embodiment of the present disclosure, a case in which each of the plurality of optical members 2000 includes two optical elements, namely, the light guiding lens 2100 and the optical lens 2200, is described by way of example. However, the present disclosure is not limited thereto, and at least one optical element capable of adjusting the path or brightness of light according to the light distribution characteristics required in the beam pattern formed by the lamp 1 for the vehicle of the present disclosure may be included in each of the plurality of optical members 2000.

The light guiding lens 2100 of each of the plurality of optical members 2000 may be disposed in front of a corresponding light source among the plurality of light sources 1000 to allow at least a portion of the light emitted from the corresponding light source among the plurality of light sources 1000 to be incident thereto.

The respective light guiding lenses 2100 of the plurality of optical members 2000 may be arranged in the vertical direction along the arrangement direction of the plurality of light sources 1000. In an embodiment of the present disclosure, a case in which the respective light guiding lenses 2100 of the plurality of optical members 2000 arranged along the vertical direction are integrally formed with each other will be described by way of example. This configuration may reduce the number of components and simplify the assembly process to reduce costs.

The respective light guiding lenses 2100 of the plurality of optical members 2000 may be arranged along the vertical direction such that the center positions thereof do not overlap one another in the vertical direction and thus are disposed closer to one side along the left-right direction gradually as they go upwardly, in the similar manner as the plurality of light sources 1000.

Each of the respective light guiding lenses 2100 of the plurality of optical members 2000 may include a light receiving portion 2110 to which the light emitted from the corresponding light source among the plurality of light sources 1000 is incident, a light emission portion 2120 disposed in front of the light receiving portion 2110 so that the light incident on the light receiving portion 2110 is emitted therefrom, and a light transfer portion 2130 to transmit at least a portion of the light that is incident on the light receiving portion 2110 to the light emission portion 2120.

Adjacent ones of the light receiving portions 2110 of the respective light guiding lenses 2100 of the plurality of optical members 2000 may be spaced apart from each other by a predetermined spacing to prevent or reduce interference from occurring between the light beams respectively emitted from corresponding light sources thereto among the plurality of light sources 1000.

In this regard, the respective light guiding lenses 2100 of the plurality of optical members 2000 may be integrally formed with one another by connecting each of the light receiving portions 2110 and each of the light emission portions 2120 via each of the light transfer portions 2130, thereby reducing the number of components and simplifying the assembly process.

In addition, the light emission portion 2120 of each of the respective light guiding lenses 2100 of the plurality of optical members 2000 may have a curved shape, which is convex in the frontward direction for concentrating the emitted light.

The respective light guiding lenses 2100 of the plurality of optical members 2000 may have different longitudinal lengths in the front-rear direction such that the lengths of the light guiding lenses increase as the respective light guiding lenses 2100 of the plurality of optical members 2000 are arranged downwardly. This is because the longitudinal positions in the front-rear direction of the plurality of light sources 1000 coincide with one another, whereas the longitudinal positions of the respective optical lenses 2200 of the plurality of optical members 2000 protrude more frontward gradually as the respective optical lenses 2200 of the plurality of optical members 2000 are arranged downwardly.

In other words, when the positions of the respective optical lenses 2200 of the plurality of optical members 2000 protrude more frontward as the respective optical lenses 2200 of the plurality of optical members 2000 are arranged along the body line of the vehicle and downwardly, a position of the light-emission portion 2120 of the light guiding lens disposed at the lower side among the respective light guiding lenses 2100 of the plurality of optical members 2000 should protrude more frontward. When the plurality of light sources 1000 have the same longitudinal position such that the plurality of light sources 1000 can be installed on one common substrate, the lengths in the front-rear direction of the light guiding lenses 2100 increase as the respective light guiding lenses 2100 of the plurality of optical members 2000 are arranged downwardly such that the position of the light-emission portion 2120 of the light guiding lens 2100 disposed at the lower side among the respective light guiding lenses 2100 of the plurality of optical members 2000 protrudes more frontward.

In this case, the plurality of light sources 1000 may be installed on one common substrate such that the number of components may be reduced compared to the case where a separate individual substrate is used for each of the plurality of light sources 1000, thereby reducing the cost and simplifying the assembly process.

Figure 8:
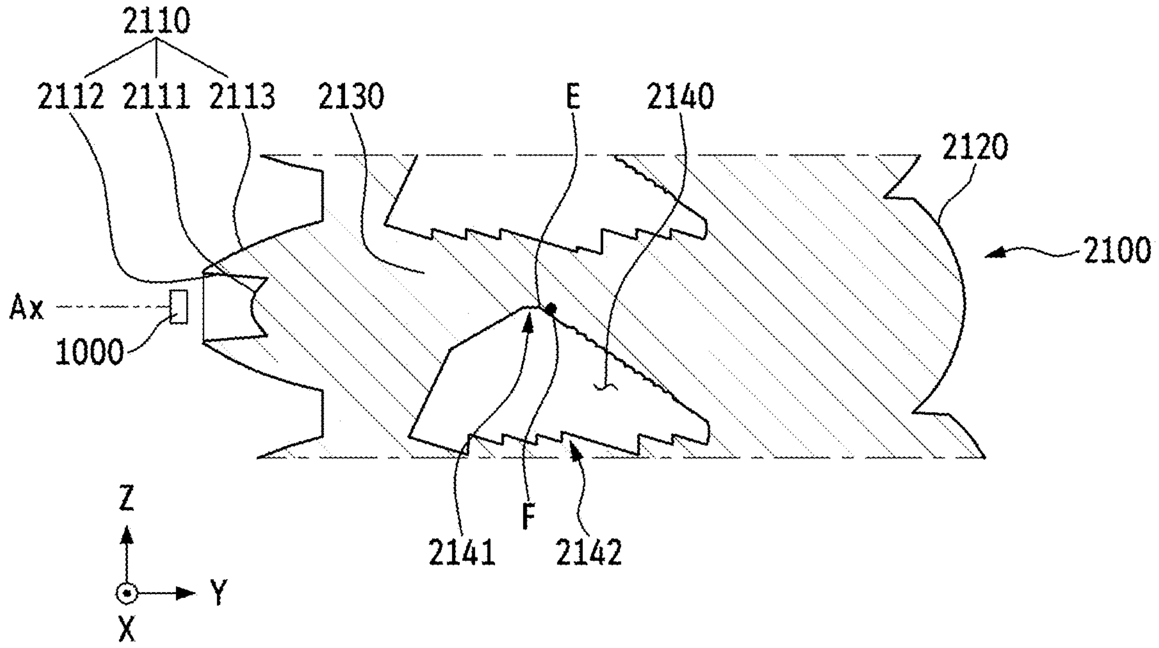
FIG. 8 is a cross-sectional view illustrating a light guiding lens according to an embodiment of the present disclosure.

FIG. 8 is a cross-sectional view illustrating a light guiding lens according to an embodiment of the present disclosure, and FIG. 8 is an example in which the light guiding lens 2100 of one of the plurality of optical members 2000 is illustrated.

Referring to FIG. 8, the light receiving portion 2110 of each of the respective light guiding lenses 2100 of the plurality of optical members 2000 may allow the light incident thereto from the corresponding light source 1000 among the plurality of light sources 1000 to be focused on or near a focus F in rear of the light emission portion 2120.

In this case, the rear focus F of the light emission portion 2120 may be formed in a shape of a point, a line, a surface, a space, or a combination thereof depending on an area on which the light is substantially condensed.

The light receiving portion 2110 may include a central surface 2111 coinciding with an optical axis Ax of the corresponding light source among the plurality of light sources 1000, a protruding surface 2112 that protrudes toward the corresponding light source from a peripheral edge of the central surface 2111, and a reflective surface 2113 that reflects the light incident on the protruding surface 2112 to allow it to proceed toward the light emission portion 2120. The reflective surface 2113 may be formed such that a lateral spacing between the reflective surface 2113 and the optical axis Ax increases as the reflective surface 2113 extends from a rear end to a front end along the optical axis Ax direction of the corresponding light source so that the light incident thereto from the protruding surface 2112 may proceed substantially in the frontward direction.

In this case, the optical axis Ax of each of the plurality of light sources 1000 may be understood as an axis that passes perpendicularly through the center of the light emitting surface. When two or more light sources correspond to one optical member, the center of the light emission area defined by the two or more light sources may be understood as the optical axis Ax.

The light transfer portion 2130 may transmit at least a portion of the light incident thereto from the light receiving portion 2110 toward the light emission portion 2030. The light receiving portion 2110 and the light emission portion 2120 may be integrally formed with each other via the light transfer portion 2130.

In order to form the low beam pattern P of FIG. 7 using the lamp 1 for a vehicle according to the present disclosure, a portion of the light incident to the light receiving portion 2110 and proceeding to the light emission portion 2120 may be blocked or obstructed to form the cut-off line CL. To this end, a shield hole (e.g., a shield void) 2140 may be formed between adjacent light guiding lenses 2100 among the plurality of optical members 2000.

The shield hole 2140 may include a shield portion 2141 and a connection portion 2142. The shield portion 2141 may be formed to be inclined generally downward in both the frontward and rearward directions with respect to an edge portion E formed at an apex disposed at or near the rear focus F of the light emission portion 2120, and thus may be formed to have a concave shape along a lower surface of the light transfer portion 2130. The connection portion 2142 may connect both opposing ends in the front-rear direction of the shield portion 2141 to each other, such that the shield hole 2140 may generally have an approximately triangular shape. In the light guiding lens 2100 disposed at the bottom end among the respective light guiding lenses 2100 of the plurality of optical members 2000, the connection portion 2142 may be absent in the shield hole 2140. Instead, the shield hole 2140 of the light guiding lens disposed at the bottom of the light guiding lenses 2100 may be formed to have a concave shape defined by the shield portion 2141.

In other words, when the respective light guiding lenses 2100 of the plurality of optical members 2000 are integrally formed with one another, the shield hole 2140 may be formed between the light guiding lenses 2100 adjacent to each other in the vertical direction among the respective light guiding lenses 2100 of the plurality of optical members 2000 in order to form the shield portion 2141. For this reason, the connection portion 2142 may be present. However, in the light guiding lens 2100 disposed at the bottom end among the respective light guiding lenses 2100 of the plurality of optical members 2000, the shield portion 2141 may be formed without the shield hole 2140. For this reason, the connection portion 2142 may be omitted.

In this regard, the shield hole 2140 may be formed between adjacent light guiding lenses among the respective light guiding lenses 2100 of the plurality of optical members 2000 as the respective light guiding lenses 2100 of the plurality of optical members 2000 are integrally formed with one another while being arranged in the vertical direction. However, the present disclosure is not limited thereto, and if the respective light guiding lenses 2100 of the plurality of optical members 2000 are separate from one another, the connection portion 2142 may be absent in the shield hole 2140 of each of the respective light guiding lenses 2100 of the plurality of optical members 2000, and thus the shield portion 2141 having the concave shape may be formed along the lower surface of the light transfer portion 2130.

The position and shape of the cut-off line CL of the low beam pattern P may vary depending on the position and shape of the edge portion E of the shield portion 2141.

Figure 9:
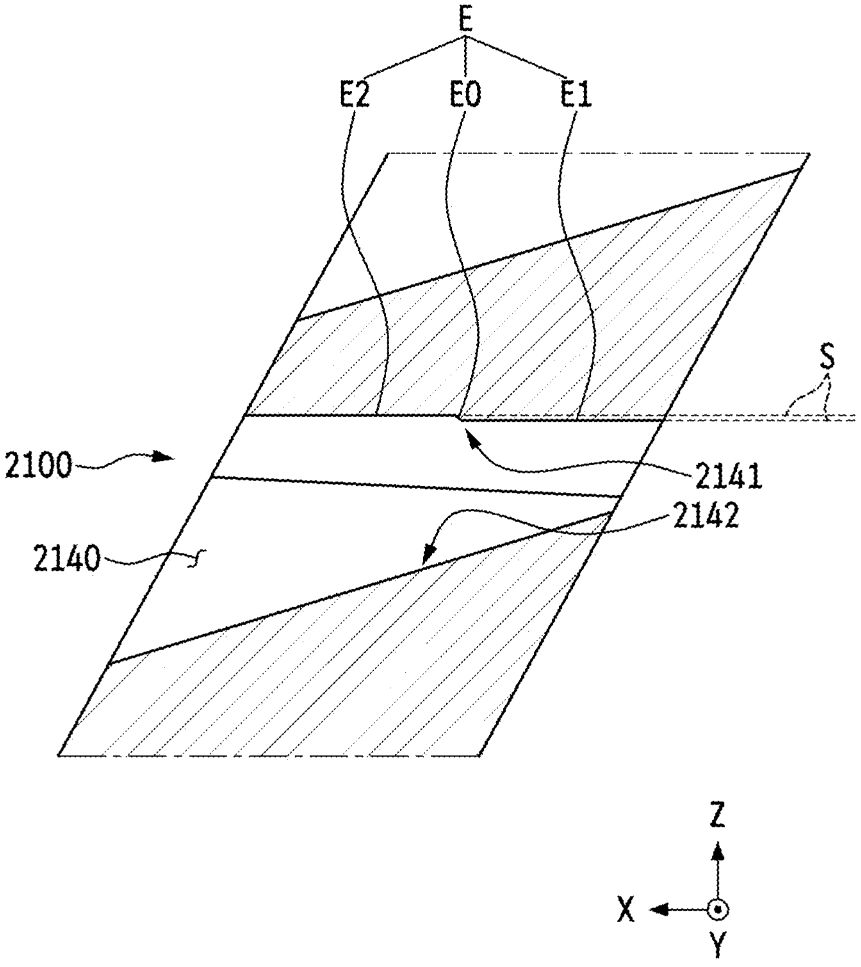
FIG. 9 is a cross-sectional view taken along line B-B' of FIG. 5.

FIG. 9 is a cross-sectional view taken along line B-B' of FIG. 5, and FIG. 9 is an example in which an edge portion E of one of the respective light guiding lenses 2100 of the plurality of optical members 2000 is illustrated.

Referring to FIG. 9, the edge portion E according to an embodiment of the present disclosure may include an inclined edge E0, and a first edge E1 and a second edge E2 formed to extend in a left-right direction from a lower end and an upper end of the inclined edge E0, respectively, to be parallel to a horizontal line S. In this case, the inclined edge E0 may serve to form the inclined line CL0, the first edge E1 may serve to form the first line CL1, and the second edge E2 may serve to form the second line CL2.

In an embodiment of the present disclosure, the first edge E1, the inclined edge E0, and the second edge E2 that extend in the stepwise manner may correspond to the configuration that both opposing portions of the cut-off line CL of the beam pattern to be formed by the lamp for the vehicle 1 of the present disclosure have the discrete vertical levels to form the step in the vertical direction as shown in FIG. 7 described above. However, the present disclosure is not limited thereto, and when the cut-off line CL is to be formed as a flat line with no step, the edge portion E may be formed as one edge in which the inclined edge E0 is omitted, and the step may not be formed between the first edge E1 and the second edge E2.

The cut-off line CL as described above may extend to be generally parallel to the horizontal line S and aligned along the left-right direction. When at least a portion of the cut-off line CL is formed to protrude beyond a reference line parallel to the horizontal line S, glare may occur toward a driver of a vehicle ahead of the vehicle of interest. On the contrary, when at least a portion of the cut-off line CL is formed to be recessed from the reference line parallel to the horizontal line S, the area to which the light is irradiated may be reduced, thereby reducing the field of view in front of the vehicle of interest. For this reason, the cut-off line CL as described above may extend to be generally parallel to the horizontal line S.

The edge portion E may generally extend in parallel with the horizontal line S so that the cut-off line CL may generally extend in parallel with the horizontal line S. The edge portion E of at least one of the respective light guiding lenses 2100 of the plurality of optical members 2000 may extend in an inclined manner at a predetermined angle with respect to the reference line parallel to the horizontal line S according to light distribution characteristics required in the beam pattern formed by the lamp 1 for a vehicle of the present disclosure. The description that the edge portion E extends in an inclined manner at a predetermined angle with respect to the reference line parallel to the horizontal line S may mean that a combination of the first edge E1 and the second edge E2 as described above extends in an inclined manner at the predetermined angle with respect to the reference line parallel to the horizontal line S.

Figure 10:
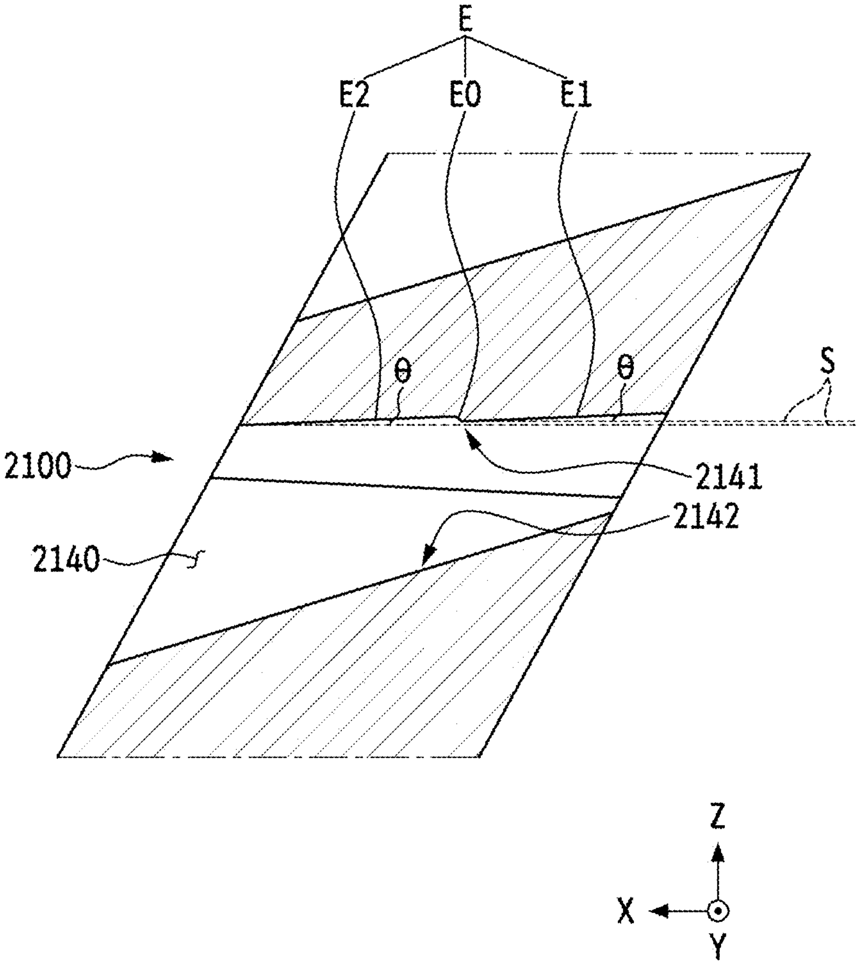
FIGS. 10 and 11 are schematic views showing a formation angle of an edge portion of a light guiding lens according to an embodiment of the present disclosure.
Figure 11:
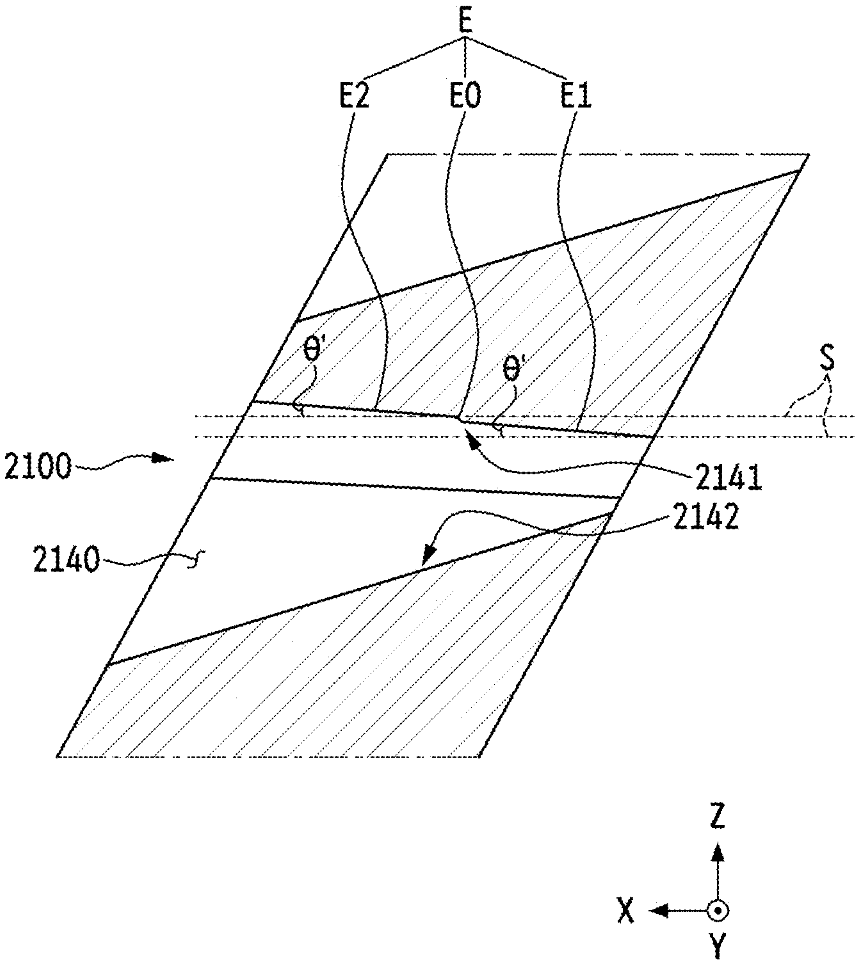

In this case, the description that the edge portion E extends in an inclined manner at the predetermined angle with respect to the reference line parallel to the horizontal line S may mean that the combination of the first edge E1 and the second edge E2 extends in an inclined manner at each of predetermined angles θ and θ' in the right upward direction or the left upward direction with respect to the reference line parallel to the horizontal line S, as shown in FIGS. 10 and 11. When the edge portion E extends in an inclined manner at a predetermined angle with respect to the reference line parallel to the horizontal line S based on the position of each of the plurality of optical members 2000, the cut-off line CL may also extend in an inclined manner at a predetermined angle with respect to the reference line parallel to the horizontal line S. In some embodiments, when the edge portion E extends in an inclined manner at a predetermined angle with respect to the reference line parallel to the horizontal line S, the cut-off line CL that extends to be inclined at a predetermined angle with respect to the reference line parallel to the horizontal line S may extend in parallel to the horizontal line S.

Figure 12:
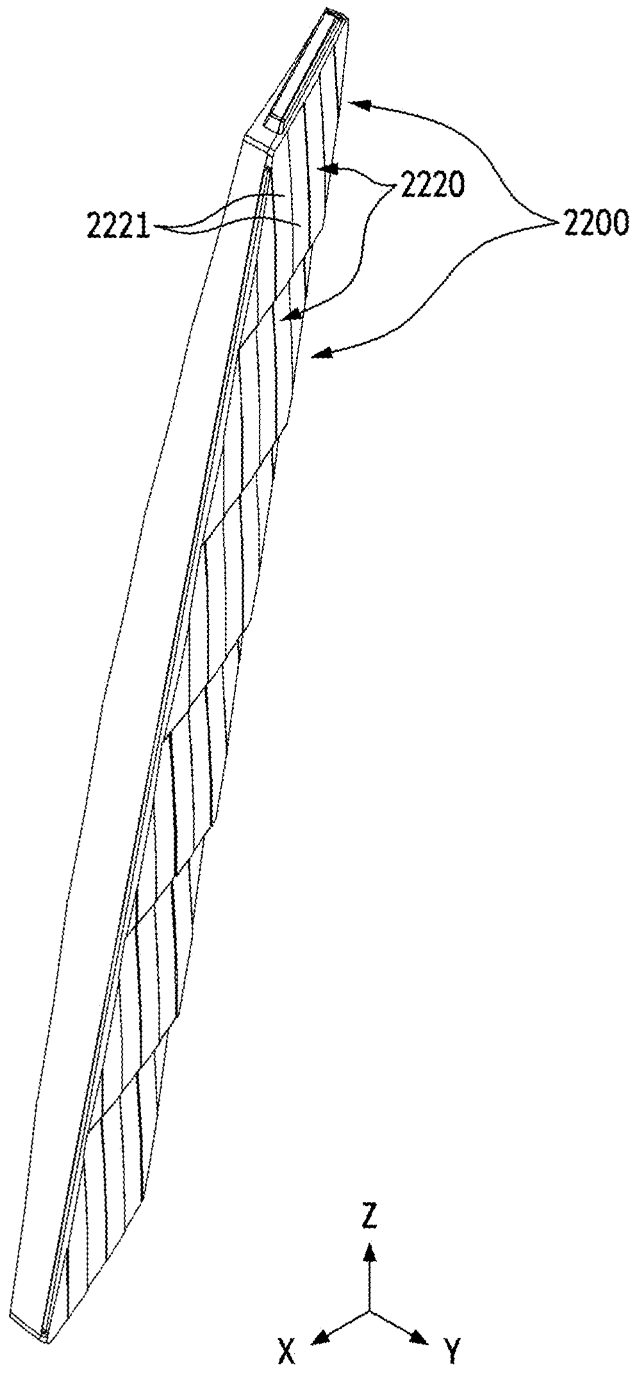
FIGS. 12 and 13 are perspective views showing a plurality of optical lenses according to an embodiment of the present disclosure.
Figure 13:
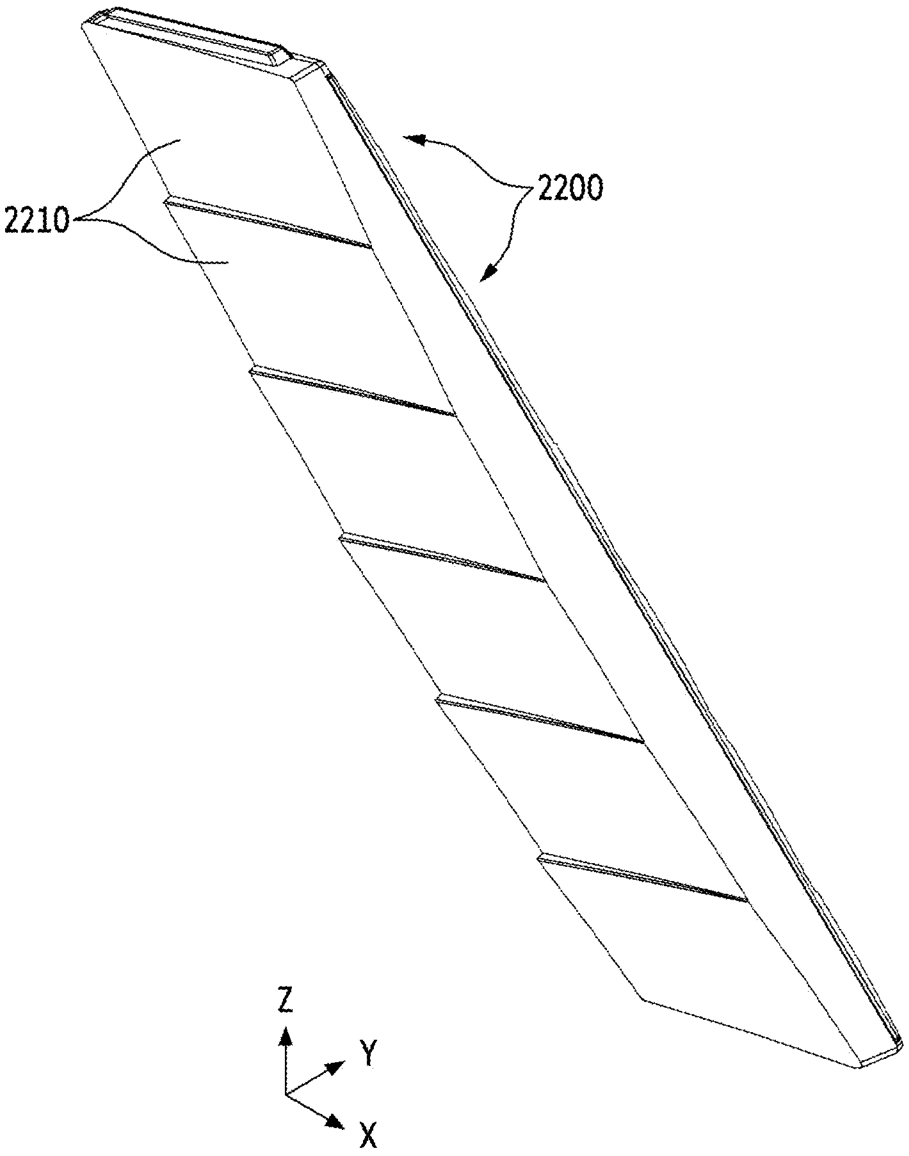
Figure 14:
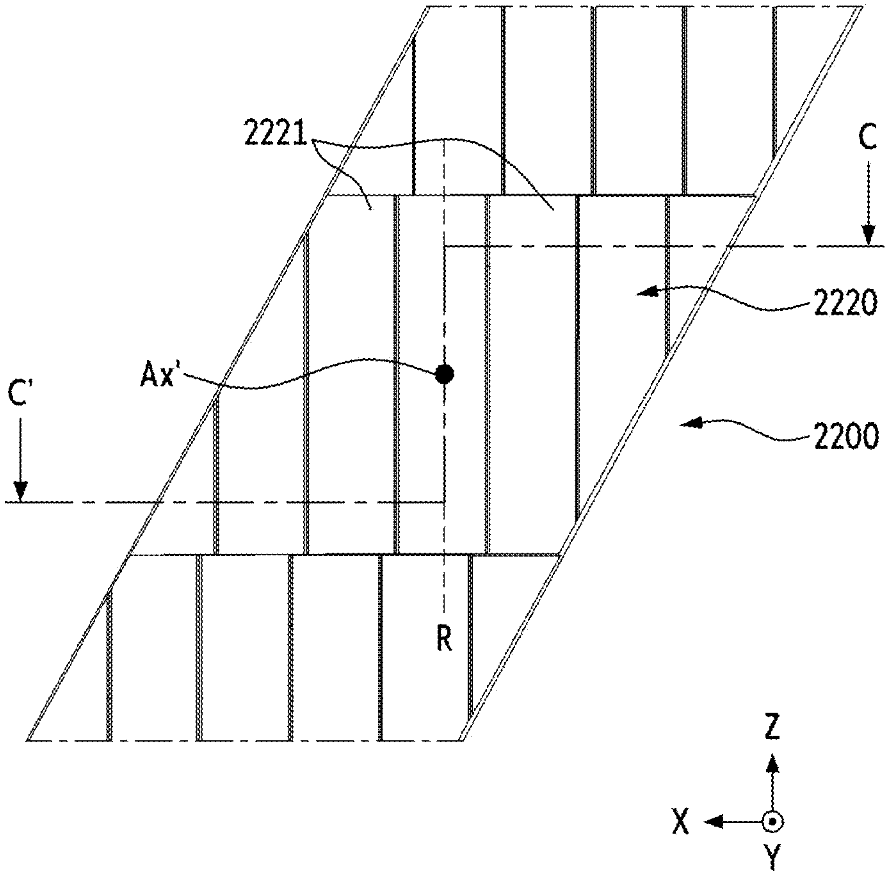
FIG. 14 is a front view showing an optical lens according to an embodiment of the present disclosure.
Figure 15:
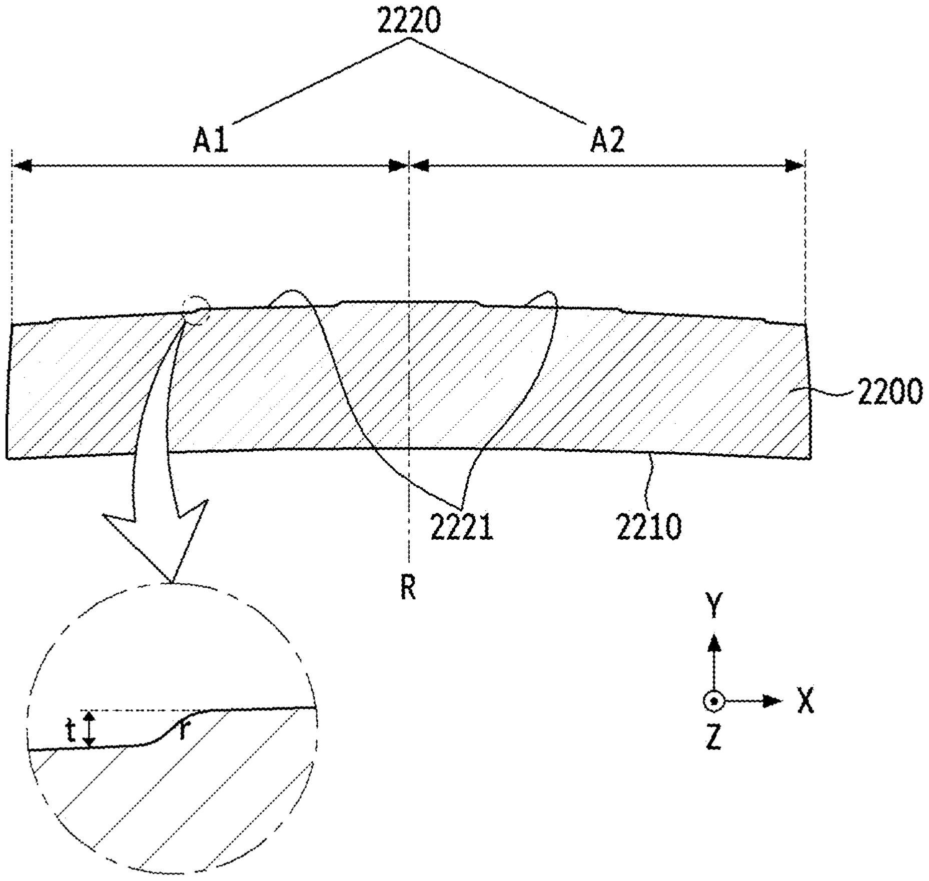
FIG. 15 is a cross-sectional view taken along line C-C' of FIG. 14.

FIG. 12 and FIG. 13 are perspective views showing respective optical lenses of a plurality of optical members according to an embodiment of the present disclosure, and FIG. 14 is a front view showing the optical lens according to an embodiment of the present disclosure. FIG. 15 is a cross-sectional view taken along line C-C' of FIG. 14, and FIGS. 14 and 15 are examples of a case in which the optical lens 2200 of one optical member among a plurality of optical members is illustrated. This example may be similarly applied to the rest of the optical lenses with only differences in positions.

Referring to FIGS. 12 to 15, the respective optical lenses 2200 of the plurality of optical members 2000 may be integrally formed with one another while being arranged in the vertical direction, in a similar manner as the light guiding lenses 2100. The respective optical lenses 2200 of the plurality of optical members 2000 may be arranged in an inclined manner such that the center positions of the respective optical lenses 2200 do not overlap one another in the vertical direction and thus are disposed closer to one side along the left-right direction gradually as they go downwardly.

In an embodiment of the present disclosure, a case in which the optical lens 2200 of each of the plurality of optical members 2000 is tilted such that the other side thereof in the left-right direction is disposed in front of one side thereof in the left-right direction will be described by way of example. This configuration is to allow the respective optical lenses 2200 of the plurality of optical members 2000 to be arranged along the body line of the vehicle, similarly to the plurality of light sources 1000.

The optical lens 2200 may allow the light incident on the light receiving surface 2210 to be emitted through the light emission surface 2220. The light emission surface 2220 of the optical lens 2200 may include a plurality of facet 2221 to allow a light path to be more easily controlled, and an outer appearance image may be improved to more superior aesthetics.

In other words, when the light emission surface 2220 is composed of a plurality of faces, that is, the plurality of facet 2221, compared to a case in which the light emission surface 2220 is formed as one face, an outer appearance design may be improved by the shape formed by boundaries between adjacent facets among the plurality of facets 2221, thereby providing improved aesthetics to the viewer.

In an embodiment of the present disclosure, a case in which the light emission surface 2220 includes a plurality of facets 2221 will be described by way of example, but this is merely an example for aiding understanding of the present disclosure. The present disclosure is not limited thereto, and at least one of the light receiving surface 2210 or the light emission surface 2220 may be configured with a plurality of facets.

In one example, the plurality of optical members 2000 may be configured such that the light guiding lens 2100 and the optical lens 2200 corresponding to each other may share a common focus. To this end, as shown in FIG. 6, the light receiving surface 2210 of the optical lens 2200 of each of the plurality of optical members 2000 may individually have a concave shape in the frontward direction, while a combination of the light receiving surfaces 2210 of the respective optical lenses 2200 of the plurality of optical members 2000 may have a convex shape in the rearward direction.

In this regard, forming the common focus by the light guiding lens 2100 and the optical lens 2200 corresponding to each other among the plurality of light guiding lenses 2100 and the plurality of optical lenses 2200 may better address a potential problem that when different individual focuses are respectively formed by the light guiding lens and the optical lens corresponding to each other among the plurality of light guiding lenses 2100 and the plurality of optical lenses 2200, the light emitted from each of the plurality of light guiding lenses 2100 may be incident on another adjacent optical lens as well as the corresponding optical lens among the plurality of optical lenses 2200, such that a glare or the like may be caused. Instead, the single focus may be formed by the light guiding lens and the optical lens corresponding to each other among the plurality of light guiding lenses 2100 and the plurality of optical lenses 2200. Thus, when light beams respectively emitted from the plurality of light guiding lenses 2100 are incident on not only the corresponding optical lenses but also adjacent optical lenses, the light beams may travel in parallel with each other, thereby preventing the glare from being caused.

In an embodiment of the present disclosure, a case in which the position of the common focus is determined based on the shape such as the curvature of each of the light emission portion 2120 of the light guiding lens 2100 and the light receiving surface 2210 of the optical lens 2200 corresponding to each other will be described by way of example. However, this is to help understanding of the present disclosure, and the present disclosure is not limited thereto. The position of the common focus may be determined by the shape of each of the light emission portion 2120 of the light guiding lens 2100, the light receiving surface 2210 of the optical lens 2200, and the light emission surface 2220 of the optical lens 2200 corresponding to one another.

In this case, the plurality of facets 2221 may be arranged along a left-right direction corresponding to a direction in which the edge portion E extends. Further, there is a high possibility that a step t may occur between facets adjacent to each other in the left-right direction due to tolerances in the manufacturing process or the like. Each of the respective edges of the facets adjacent to each other may have a curved shape having a predetermined curvature r due to a mold process. The step t and the curvature r may cause light to be irradiated in an unnecessary direction.

In addition, both opposing areas around a center line R of the light emission surface 2200 of the optical lens 2200 corresponding to the light emission surface of each of the plurality of optical members 2000 may respectively form the first line CL1 and the second line CL2 of FIG. 7 described above. The center line R extends in the vertical direction, and passes through an optical axis Ax', which passes through the center point of the light receiving surface and the light emission surface in a perpendicular manner thereto. In the front view of the lamp 1 for a vehicle of the present disclosure, the light beams respectively emitted from both opposing areas around the center line R may be emitted by crossing each other so that the light beam emitted from a first area A1 disposed on the right side with respect to the center line R forms the first line CL1 of the cut-off line CL, while the light beam emitted from the second area A2 disposed on the left side with respect to the center line R forms the second line CL2 of the cut-off line CL2.

In this case, the optical axis Ax' of each of the plurality of optical members 2000 may be understood as an optical axis of a combination of the optical guiding lens 2210 and the optical lens 2200 corresponding to each other. In an embodiment of the present disclosure, a case in which the optical axis Ax of the light sources and the optical axis Ax' of the optical member corresponding to each other among the plurality of light sources 1000 and the plurality of optical members 2000 coincide with each other is described by way of example. This is merely an example for helping understanding of the present disclosure, and the present disclosure is not limited thereto. The optical axis Ax of the light sources and the optical axis Ax' of the optical member corresponding to each other among the plurality of light sources 1000 and the plurality of optical members 2000 may be different depending on the light distribution characteristics required in the beam pattern to be formed by the vehicle lamp 1 of the present disclosure.

The first line CL1 is a section corresponding to a driving lane. When the light that forms the first line CL1 is irradiated to a position on top of the second line CL2 with respect to the center of the beam pattern, glare may be caused to the driver of the vehicle in front of the present vehicle.

In other words, as shown in FIG. 7, the first line CL1 and the second line CL2 are formed to have a step relative to each other in the vertical direction in the cut-off line CL of the beam pattern formed by the vehicle lamp 1 of the present disclosure. In this regard, the first line CL1 has a higher vertical level than the second line CL2. In this case, even when the light that forms the first line CL1 is irradiated to the second line CL2 side with respect to the center of the beam pattern, glare may be caused due to the light irradiated to a position on top of the second line CL2. However, when the light that forms the second line CL2 is irradiated to the first line CL1 side with respect to the center of the beam pattern, the light overlaps an area under the first line CL1, such that no glare occurs.

Accordingly, in an embodiment of the present disclosure, a direction in which the step t between the adjacent facets among the plurality of facets 2221 is formed to face may be adjusted to prevent the light that forms the first line CL 1 from being irradiated to a position on top of the second line CL 2, which may prevent the occurrence of glare.

Specifically, among the plurality of facets 2221, the facet disposed in the first area A1 from which the light for forming the first line CL is emitted may be formed such that a position thereof recedes rearward as the facet extends laterally away from the center line R. Thus, the step t between the adjacent facets may be directed in a backward direction.

Figure 16:
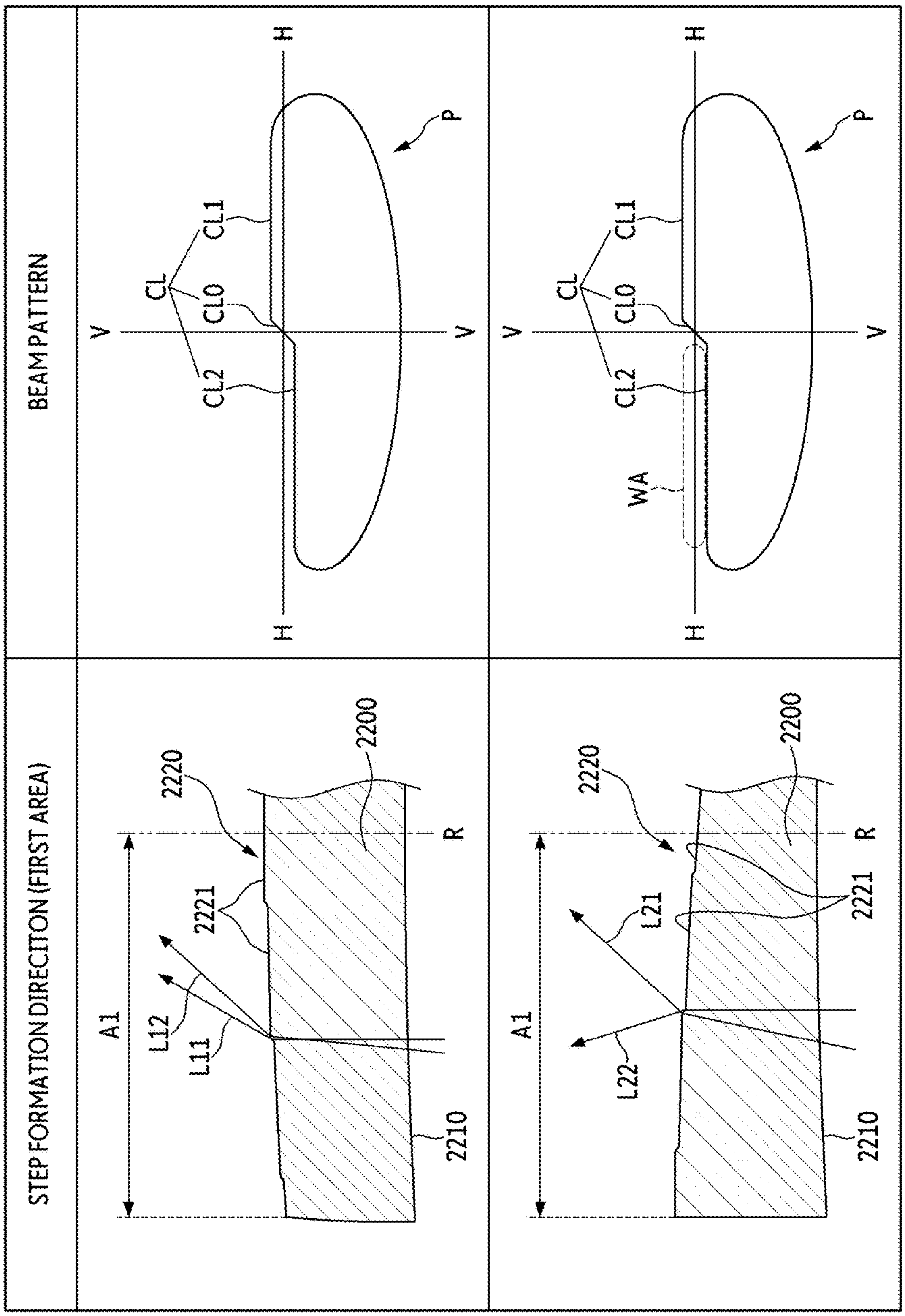
FIG. 16 is a schematic view illustrating a beam pattern formed according to a direction in which a step is formed between adjacent facets among a plurality of facets according to an embodiment of the present disclosure.

When, as described above, the step t between adjacent facets among the facets disposed in the first area A1 through which the light for forming the first line CL is emitted among the plurality of facets 2221 is directed backward, the light beams L11 and L12 emitted to form the first line CL1 may be prevented from being irradiated to a position on top of the second line CL2 disposed under the first line CL1 due to the curvature r near the edge of the facet, as shown in FIG. 16, thereby preventing a glare area WA from being generated at the position above the second line CL2.

On the other hand, among the plurality of facets 2221, the facet disposed in the first area A1 from which the light for forming the first line CL is emitted may be formed such that a position thereof is closer to the front side as the facet extends laterally away from the center line R. Thus, the step t between the adjacent facets may be directed forward. In this case, partial light L22 among the light beams L21 and L22 emitted to form the first line CL1 may be irradiated to the position above the second line CL2 due to the curvature r near the edge of the facet, posing a concern to generate the glare area WA above the second line CL2.

In an embodiment of the present disclosure, the facet disposed not only in the first area A1 but also in the second area A2 among the plurality of facets 2221 may be formed such that the direction in which the step t defined between the adjacent facet faces rearwards. This configuration may be applicable regardless of whether the driver's seat is on the right side (i.e., for the right hand drive (RHD)) or the left side (i.e., for the left hand drive (LHD)).

In other words, in the view of the lamp 1 for a vehicle of the present disclosure, in the case of LHD (or the right hand traffic), the light emitted from the area disposed on the right side among both opposing sides of the light emission surface 2220 with respect to the center line R may be irradiated to the driving lane. In this case, as shown in FIG. 7, the first line CL1 may be formed on the right side with respect to the center of the beam pattern. On the other hand, in the case of RHD (or the left hand traffic), the light emitted from the area disposed on the left side among both opposing sides of the light emission surface 2220 with respect to the center line R may be irradiated to the driving lane. In this case, contrary to FIG. 7 described above, the first line CL1 may be formed on the left side with respect to the center of the beam pattern. For this reason, the step t between adjacent facets in each of the both opposing areas A1 and A2 of the light emission surface 2220 with respect to the center line R may be directed in the rearward direction. Accordingly, the facet disposed at the center of the light emission surface 2220 among the plurality of facet 2221 may be disposed to be the closest to the front side, and the remaining facets may be disposed such that the positions thereof recede rearward as the positions thereof go away from the center line R of the light emission surface 2220 to either side, so that the step t between the adjacent facets may be directed in the backward direction.

Figure 17:
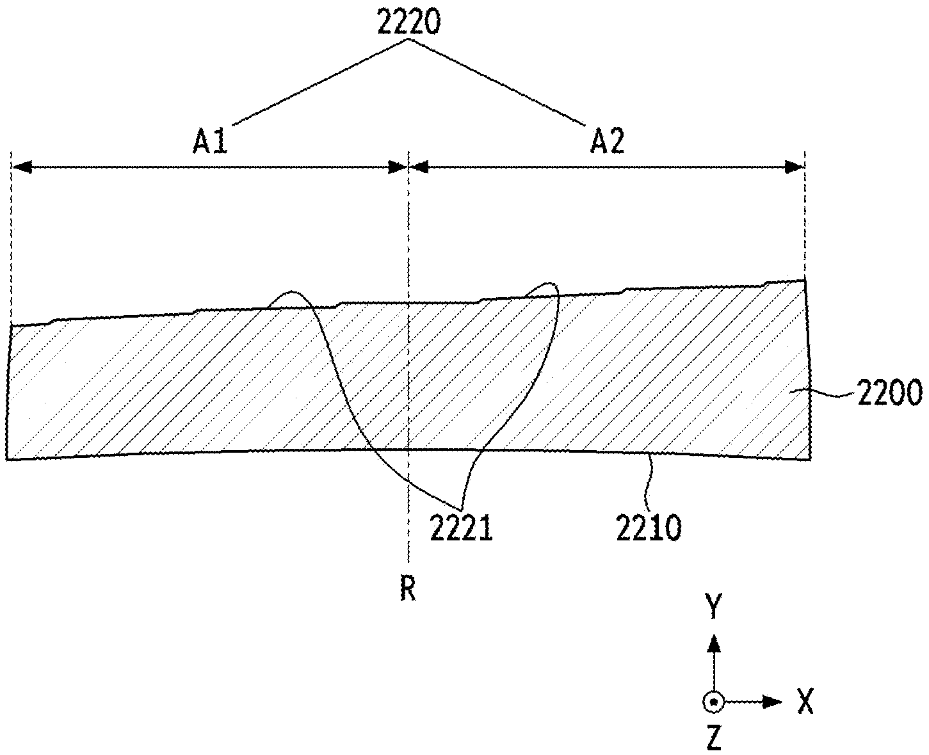
FIG. 17 is a cross-sectional view showing an optical lens according to another embodiment of the present disclosure.

In an embodiment of the present disclosure, a case in which in each of the both opposing areas A1 and A2 of the light emission surface 2220 with respect to the center line R, the facets are disposed such that the positions thereof are closer to the rear side as the positions thereof are arranged in a direction from the center line R of the light emission surface 2220 to each of both opposing side ends, so that the step t between the adjacent facets may be directed in the backward direction has been described above by way of example. However, this is merely an example to help understanding of the present disclosure, and the present disclosure is not limited thereto. In some embodiments, as shown in FIG. 17, in the second area A2 of the light emission surface 2220 with respect to the center line R, the facets may be configured such that the positions thereof progress forward as the positions thereof go away from the center line R of the light emission surface 2220 toward the distal side, so that the step t between the adjacent facets may be directed in the frontward direction. Thus, even when the light forming the second line CL2 having the vertical level lower than that of the first line CL1 is irradiated to the first line CL 1 side with respect to the center of the beam pattern, the light may overlap with the area under the first line CL 1 such that glare may be prevented.

As described above, the lamp 1 for a vehicle according to the present disclosure may satisfy the light distribution characteristics required in the beam pattern to be formed by the lamp 1 for a vehicle according to the present disclosure by adjusting the angle at which the edge portion E extends based on the position of each of the light guiding lenses 2100 of each of the plurality of optical members 2000 arranged in the vertical direction.

In addition, in the lamp 1 for a vehicle according to the present disclosure, when the light emission surface of each of the plurality of optical members 2000, that is, the light emission surface 2220 of the optical lens 2200 includes the plurality of facets 2221, the direction in which the step (formed due to the manufacturing errors or the like) between adjacent facets among the plurality of facet 2221 faces may be adjusted to prevent the occurrence of glare.

In concluding the detailed description, those skilled in the art will appreciate that variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle, comprising:

at least one light source; and at least one optical member disposed in front of the at least one light source to allow light emitted from the at least one light source to be irradiated therethrough in a forward direction to form a beam pattern, wherein the at least one optical member includes a plurality of facets arranged in a predetermined direction to constitute a light emission surface of the at least one optical member, wherein the light is emitted from the light emission surface in the forward direction, wherein a center line vertically extends in a perpendicular manner to an optical axis of the at least one optical member such that the center line divides the light emission surface into a first area and a second area, which are laterally disposed with respect to the center line, wherein facets belonging to at least one of the first area or the second area are arranged such that positions of the facets are progressively shifted rearward with increasing lateral distance from the center line, thereby forming a rearwardly inclined interfacial surface between adjacent facets, and wherein the rearwardly inclined interfacial surface causes light emitted therethrough to be refracted toward the center line.

2. The lamp for the vehicle of claim 1, wherein an edge area of each facet that forms the rearwardly inclined interfacial surface among the plurality of facets includes a curved shape having a predetermined curvature.

3. The lamp for the vehicle of claim 1, wherein the beam pattern is formed such that the light is irradiated below a cut-off line, wherein the cut-off line includes a first line and a second line, which extend and are arranged in a left-right direction, and wherein the first line is disposed higher than the second line.

4. The lamp for the vehicle of claim 3, wherein the first line corresponds to a driving lane of the vehicle, and the second line corresponds to an opposite lane to the driving lane.

5. The lamp for the vehicle of claim 3, wherein light for forming the first line is emitted through the first area, and light for forming the second line is emitted through the second area, and wherein the light emission surface causes the light emitted from the first area and the light emitted from the second area to be refracted such that an arrangement direction of the first line and the second line is opposite to an arrangement direction of the first area and the second area.

6. The lamp for the vehicle of claim 5, wherein facets belonging to the first area of the light emission surface, among the plurality of facets, are arranged such that positions of the facets are progressively shifted rearward with increasing lateral distance from the center line, thereby forming the rearwardly inclined interfacial surface between adjacent facets.

7. The lamp for the vehicle of claim 5, wherein facets belonging to the second area of the light emission surface, among the plurality of facets, are arranged such that positions of the facets are progressively shifted rearward with increasing lateral distance from the center line, thereby forming the rearwardly inclined interfacial surface between adjacent facets.

8. The lamp for the vehicle of claim 5, wherein facets belonging to the second area of the light emission surface, among the plurality of facets, are arranged such that positions of the facets are progressively shifted forward with increasing lateral distance from the center line, thereby forming a forwardly inclined interfacial surface between adjacent facets, and wherein the forwardly inclined interfacial surface allows at least some of light emitted therethrough to be refracted away from the center line.

9. The lamp for the vehicle of claim 5, wherein the plurality of facets are arranged such that positions thereof are progressively shifted rearward with increasing lateral distance from the center line, thereby forming the rearwardly inclined interfacial surface between adjacent facets.

10. The lamp for the vehicle of claim 1, wherein the at least one light source includes a plurality of light sources arranged in a vertical direction, and wherein the at least one optical member includes a plurality of optical members arranged in an arrangement direction of the plurality of light sources.

11. The lamp for the vehicle of claim 1, wherein the at least one optical member includes: a light guiding lens disposed in front of the at least one light source; and an optical lens disposed in front of the light guiding lens, and wherein the light emission surface of the at least one optical member constitutes a light emission surface of the optical lens.

12. The lamp for the vehicle of claim 11, wherein the light guiding lens includes:

a light receiving portion to which the light emitted from the at least one light source is incident;

a light emission portion disposed in front of the light receiving portion so as to emit the light incident thereto from the light receiving portion; and a shield portion including an edge portion disposed at a rear focus of the light emission portion, wherein the edge portion is configured to obstruct a portion of the light from being directed to the light emission portion, and wherein the plurality of facets are arranged along a direction in which the edge portion extends.

13. The edge portion of claim 12, wherein the edge portion includes: a first edge; and a second edge having a vertical level higher than a vertical level of the first edge, and wherein facets belonging to one area corresponding to the first edge among the first area and the second area are arranged such that positions of the facets are progressively shifted rearward with increasing lateral distance from the center line, thereby forming the rearwardly inclined interfacial surface between adjacent facets.

14. The lamp for the vehicle of claim 12, wherein the edge portion extends in parallel to a horizontal line.

15. The lamp for the vehicle of claim 12, wherein the edge portion is inclined at a predetermined angle with respect to a reference line that is parallel to a horizontal line.

* * * * *